United States Patent [19]

Griffiths

[11] Patent Number: 5,026,141
[45] Date of Patent: * Jun. 25, 1991

[54] STRUCTURAL MONITORING SYSTEM USING FIBER OPTICS

[75] Inventor: Richard W. Griffiths, Pacific Palisades, Calif.

[73] Assignee: G2 Systems Corporation, Pacific Palisades, Calif.

[*] Notice: The portion of the term of this patent subsequent to Mar. 31, 2004 has been disclaimed.

[21] Appl. No.: 428,881

[22] Filed: Oct. 30, 1989

Related U.S. Application Data

[60] Division of Ser. No. 323,498, Mar. 13, 1989, Pat. No. 4,927,232, which is a continuation-in-part of Ser. No. 32,042, Mar. 27, 1987, Pat. No. 4,812,645, which is a continuation-in-part of Ser. No. 712,889, Mar. 18, 1985, Pat. No. 4,654,520, which is a continuation-in-part of Ser. No. 571,364, Jan. 16, 1984, abandoned, which is a continuation of Ser. No. 295,600, Aug. 24, 1981, abandoned.

[51] Int. Cl.⁵ .............................................. G02B 6/26
[52] U.S. Cl. .............................. 350/96.29; 350/96.23; 250/227.14; 250/227.15
[58] Field of Search ................... 350/96.23, 96.29; 250/227.14, 227.15, 227.24, 227.17

[56] References Cited

U.S. PATENT DOCUMENTS 4,654,520 3/1987 Griffiths .................... 350/96.23 X
4,701,614 10/1987 Jaeger et al. ........................ 250/227
4,794,619 12/1988 Tregay .......................... 350/96.29 X
4,812,645 3/1989 Griffiths ............................ 250/227

FOREIGN PATENT DOCUMENTS 575196 2/1986 Australia .
2937824 10/1980 Fed. Rep. of Germany .
3305234 8/1984 Fed. Rep. of Germany .
0079938 6/1981 Japan .
2058394 4/1981 United Kingdom .
2091874 8/1982 United Kingdom .
2125179 5/1984 United Kingdom .
2145515 3/1985 United Kingdom .

Primary Examiner—John D. Lee
Assistant Examiner—Phan T. Heartney
Attorney, Agent, or Firm—Kelly, Bauersfeld & Lowry

[57] ABSTRACT

An optical fiber is securely and continuously engaged by a structure such as a pipeline, offshore platform, bridge, building, dam or even a natural object or fluid medium. A light signal is passed into one end of the optical fiber. Any physical movement of the structure, or sectional movements along the optical fiber path, such as deflection, bending, displacement (changes in linear uniformity) or fracture of the structure caused, for example, by stress, strain, pressure, temperature, etc., will necessarily affect the optical fiber. As a consequence, detectable changes will occur in the "electro-optic signature" (for measurements made at the input end of the optical fiber) or in the light signal transmission (for measurements made at the opposite end of the optical fiber). A preferred optic fiber construction comprises a core and cladding contained within a protective buffer coating, wherein the buffer coating includes a particulate material for engaging the cladding in a manner altering reflective or transmission or other "electro-optic signature" characteristics of the fiber when the buffer coating is subjected to radial forces. The particulate material can be uniformly or nonuniformly distributed about the cladding to provide variable sensitivity.

3 Claims, 5 Drawing Sheets

STRUCTURAL MONITORING SYSTEM USING FIBER OPTICS

This is a division of application Ser. No. 323,498, filed Mar. 13, 1989 (U.S. Pat. No. 4,927,232) which is a continuation-in-part of copending U.S. Ser. No. 032,042, filed Mar. 27, 1987, now U.S. Pat. No. 4,812,645, issued Mar. 14, 1989, which is a continuation-in-part of copending U.S. application Ser. No. 06/712,889, filed Mar. 18, 1985, now U.S. Pat. No. 4,654,520, issued Mar. 31, 1987, which in turn is a continuation-in-part of copending U.S. application Ser. No. 06/571,364, filed Jan. 16, 1984, now abandoned, which application is a continuations of copending U.S. application Ser. No. 06/295,600, filed Aug. 24, 1981, and now abandoned.

BACKGROUND OF THE INVENTION

This invention relates generally to structural monitoring and more particularly, to a method and apparatus for monitoring man-made or natural structures using fiber optics. Such monitoring may be for the determination of integrity or the thermal or pressure related conditions effecting such structures.

There are many man-made structures, such as pipelines, offshore platforms, buildings, bridges, dams and the like for which structural integrity monitoring is important to verify design codes, test loadings and forewarn potential or actual failures of the structure or parts thereof. For example, it is known to place strain gauges, microphones for acoustic emissions, tilt meters using accelerometers and the like along a structure, such as a marine riser or pipeline to provide signals indicative of strains or deflections beyond normal limits.

Movements in natural objects, such as earth strata or rock formations adjacent to an earthquake fault, are more difficult to measure because of inhomogeneity. Seismic, tilt, meter or land surveying techniques are consequently employed to measure acceleration, tilting or displacement, respectively.

While the use of strain gauges or other measurement means periodically spaced along a structure will serve to aid in providing the desired strain data, only those discrete points on the structure to which the strain gauge is secured are monitored. There may be other locations on the structure sufficiently spaced from the point of attachment of the strain gauge or other sensor which will have an influence thereon and yet experience a physical movement or stress which could be significant to the safety or potential failure of the structures.

In addition, power must be supplied to such prior art sensors and data must be acquired, all of which involves cable, power and telemetry equipment, plus associated logistic and maintenance support. The cost for such a system can become excessive and reliability can become impaired because of the number of elements involved.

Attempts have been made to overcome this difficulty by the development of structural frequency-measurement systems placed at a central point on a structure. The technique employs Fourier analysis to detect modal shifts in frequency resulting from changes in structural integrity, such as fractures in members or even loss of members. In the case of an offshore platform, however, the variations in loading on the structure, non-linearity of the foundation (piling) and inconsistency of natural excitation have precluded sufficient signal to noise ratio to render such a system feasible for identifying the location of structural changes.

In view of the foregoing, there is a need for an improved method and apparatus for monitoring some structures wherein all points along the structure, or between designated parts of a structure, can be "continuously" and reliably monitored. By such a "continuous" arrangement, location of structural movement could be determined, there being no gaps in the monitoring system.

SUMMARY OF THE INVENTION

With the foregoing in mind, the present invention contemplates an improved method and apparatus for monitoring structural integrity or thermal or pressure related conditions or changes wherein the monitoring is accomplished by means of fiber optics.

More particularly, for structural integrity involving deflection, bending or displacement, physical movements are monitored between spaced points on a structure by attaching at least one optical fiber to the structure to extend from at least one of the spaced points to the other and thereby engage all points along the structure as a continuum between the spaced points.

A light signal is then passed into the optical fiber and changes in this light signal resulting from the physical movements of the structure are then detected. The detected changes can be a result of reflections, Rayleigh back-scattering, and the like in a light signal (generally pulsed) as a consequence of a movement of the optical fiber. In this case, the detected changes are made at the input end of the optical fiber, these changes being coupled out be means of an optical coupler.

In another embodiment, the light signal (generally continuous) is passed into one end of the optical fiber and changes therein are detected at the other end of the optical fiber. In this case, the detected changes are changes in the transmission characteristics of the light signal through the optical fiber, such as attenuation or phase shift.

In other alternative applications of the invention, an elongated portion of the optical fiber may be coupled in continuous intimate contact with various types of structures with a view toward monitoring specific physical parameters, such as stress, strain, pressure, temperature, etc. In some embodiments, the fiber is carried by a physical structure such as a dam or storage tank or other substantially rigid member to detect pressure gradients or variations acting along the length of the structure. In some cases, the structure may be a fluid with pressure acting upon the fiber. Alternately, the fiber may be provided with a protective jacket designed to transmit pressure forces from a surrounding fluid to the fiber, in which case the structure may be viewed as the protective jacket. In other embodiments, the fiber may be provided with a jacket for transmitting temperature responsive forces to the fiber, with an outer casing being required in some instances to isolate the fiber from surrounding pressure variations; in these cases, the jacket or casing may be regarded as a structure.

A computerized data bank is employed to facilitate the identification of the detected changes and to provide an alarm when these changes exceed preset levels.

A preferred optical fiber construction comprises a core and cladding encased within a specialized buffer coating designed to protect the core and cladding and further to induce changes in fiber light signals in response to radial forces. In this regard, the buffer coating includes a fine particulate or aggregate material which may be uniformly dispersed within a buffer carrier such as polymer material. Application of radial forces to the buffer coating causes the particulate to intimately engage the cladding for purposes of altering the characteristics of a transmitted or reflected light signal. In one form, the fiber with buffer coating can be utilized as a pressure sensor to monitor pressure changes on a fluid or solid structure. In another form, a temperature responsive jacket can be formed about the buffer coating to apply variable radial forces as a function of temperature changes. In still another form, an alternative jacket construction such as a braided jacket can be used to apply variable radial forces to the buffer coating in response to axial strain changes.

Other features and advantages of the present invention will become more apparent from the following detailed description, taken in conjunction with the accompanying drawings which illustrate, by way of example, the principles of the invention.

BRIEF DESCRIPTION OF THE DRAWINGS

A better understanding of this invention as well as further features and advantages thereof will be had by now referring to the accompanying drawings in which.

DETAILED DESCRIPTION OF THE PREFERRED EMBODIMENTS

Figure 1:
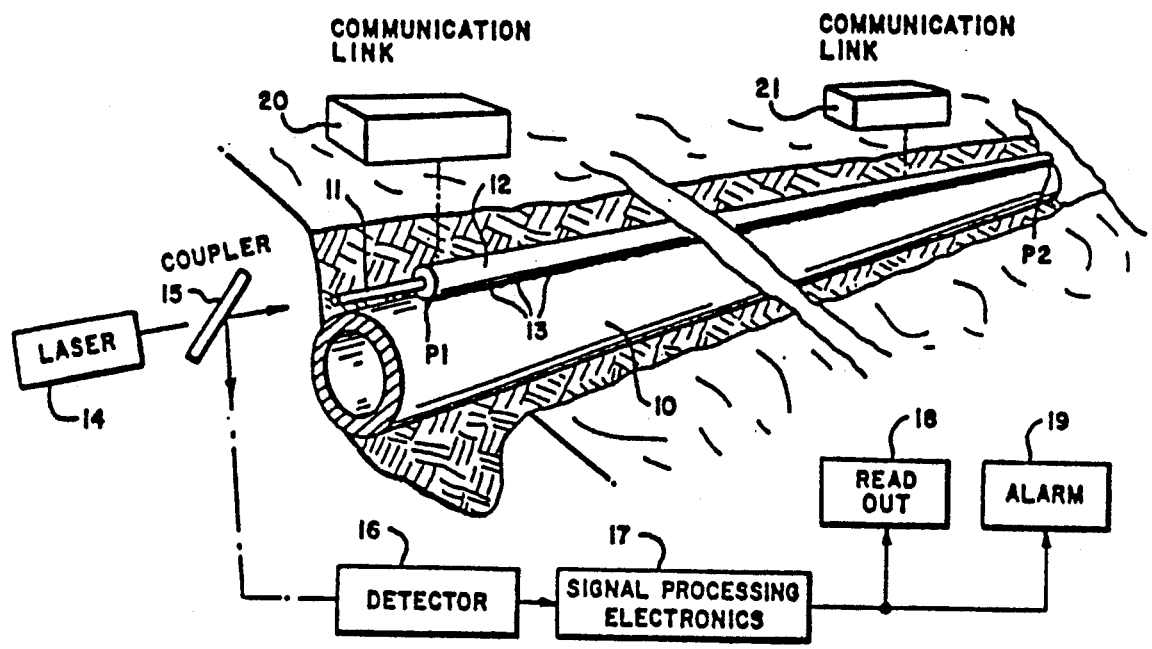
FIG. 1 is a cut-away perspective view of a structure in the form of a pipeline together with apparatus illustrated in block form for monitoring the structural integrity of the pipeline in accord with one embodiment of the present invention.

Referring first to FIG. 1, there is shown a portion of a pipeline 10 constituting an example of a structure to be monitored. In this respect, and as mentioned heretofore, pipelines have been monitored by securing strain gauges or other sensors at periodic points along the line to detect undue strains or movements in an effort to anticipate buckling or other types of failure along the pipeline.

In accord with the present invention, the monitoring of physical movements of the structure is carried out between spaced points indicated in FIG. 1 at P1 and P2 by means of an optical fiber 11 surrounded by a protective sheath 12 useful in attaching the optical fiber to the structure 10. The fiber extends from at least one of the spaced points such as P1 to the other such as P2. It will be understood that P1 and P2 are merely provided as convenient reference points and would normally define the end points of the lengths of the structure to be monitored.

As indicated by the numeral 13, the optical fiber sheath and therefore the optical fiber itself, is continuously attached to the structure 10 so that any physical movement of the structure will result in physical movement of the optical fiber.

Appropriate means are provided for passing a light signal into one end of the optical fiber. In FIG. 1, this means constitutes a laser indicated by the block 14.

Also provided are means for detecting and indicating changes in the light signal provided by the laser 14. This latter detector means receives a reverse travelling wave of the light signal coupled out of the system by coupler 15 and constitutes a detector 16 and cooperating signal processing electronics indicated by the block 17. The detector 16 would normally be a photodetector arrangement. The detected changes in the signal can be read out as indicated by the block 18. By presetting given limits, an alarm 19 can be caused to sound should the detected changes exceed the preset limits.

It will be understood that any type of physical movement of the optical fiber such as slight bending will have an effect upon the reverse travelling wave of the introduced light signal along the optical fiber. Thus, various parameters can be detected, such as back-scattering sites, discontinuities, attenuation, and the like. Changes in these parameters result from the physical attachment of the optical fiber to the structure and occur as a consequence of physical movements of the pipeline structure 10.

Techniques for indicating the magnitude and location of such changes in the physical characteristics of an optical fiber per se are well known in the art. For example, U.S. Pat. No. 4,243,320 discusses a method for testing optical fibers in which reflected signals produce self-coupling in a laser used to provide the original signal. This self-coupling changes the lasing activity. Any change in the lasing activity will be an indication of a change in the reflection parameter. Thus, the position of a reflected discontinuity in an optical fiber can be determined by simply monitoring the lasing activity. It is to be understood that the present invention is not directed to the specific techniques in and of themselves since the same are already known. Rather, the present invention has to do with combining an optical fiber with a structure, either man-made or natural, to enable structural integrity to be monitored by means of the optical fiber and electro-optic measurements.

Still referring to FIG. 1, there is indicated by the blocks 20 and 21 a communication link at the spaced points P1 and P2. Thus, the same optical fiber used for the monitoring operation can also serve as such a communications link for transmission of voice and/or data and even signals for control of the entire system. In other words, since the optical fiber is already in place, it can additionally serve to transmit data in the manner of conventional fiber optics used in the communications industry on a time-share or phase shift basis.

In FIG. 1, the optical fiber is shown secured along the top of the pipe structure 10. It should be understood that the optical fiber could be secured internally on the undertop wall of the pipe if desired.

Figure 2:
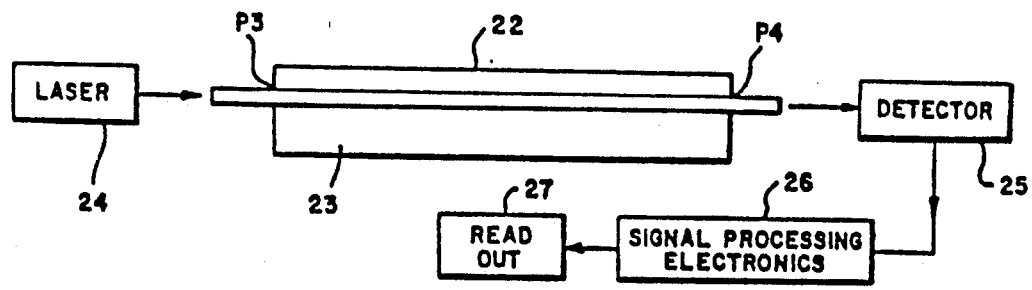
FIG. 2 schematically illustrates partly in block form another embodiment of the structural monitoring system of the present invention.

Referring now to FIG. 2, there is shown at 22 a structure to which an optical fiber 23 has been attached to extend between spaced points P3 and P4. In this embodiment, light from a laser shown at 24 is passed into one end of the optical fiber 23 and the detecting means is positioned to pick up the transmitted light at the other end. This detecting means includes a detector 25 and appropriate signal processing electronics indicated by the block 26. A read-out or display is shown at 27.

In the embodiment of FIG. 2, the changes detected are changes in the transmission characteristics of the light signal.

In both FIGS. 1 and 2, the light signal provided by the laser blocks introduced into the optical fiber can be either continuous, pulsed or even polarized or a combination can be either single or multi mode. As mentioned, the changes in transmission, reflection, back-scattering, polarization, attenuation, phase shift and scattering loss and the like of the light signal resulting from physical movement of or pressure on the optical fiber itself, as a result of the physical movements of the structure, can be detected. The magnitude and location of the physical movement or pressure-causing effect can thus be determined.

The light signal injection technique and optical fiber signature or transmission measurements are similar to those used in the manufacture and testing of optical fibers or for the assessment of field distributions along such optical fibers.

Figure 3:
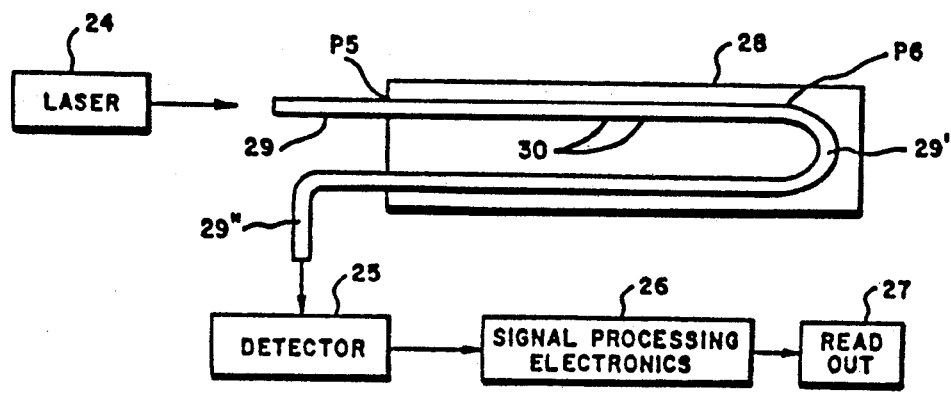
FIG. 3 is a schematic block diagram similar to FIG. 2 illustrating a modification of the monitoring technique.

Referring now to FIG. 3 there is illustrated another arrangement for monitoring a structural member using an optical fiber and light signal transmission characteristics. In this embodiment, there is shown a structure 28 having spaced points defined at P5 and P6. An optical fiber 29 is continuously secured to the structure 28 as indicated at 30 to pass between the points P5 and P6. In this embodiment, the other end of the optical fiber 29 adjacent to the point P6 reverses as at 29' and returns to a point 29" adjacent to the one point P5 to define a loop. A light signal is passed into one end of the optical fiber 29 as indicated by the laser block 24 and changes in the transmission characteristics of the light signal are detected at the other end 29" as by a detector 25 and cooperating signal processing electronics indicated by the block 26 connecting to read-out 27. The blocks 25, 26 and 27 may be the same as the correspondingly numbered blocks shown in FIG. 2.

In FIG. 3, the first portion of the optical fiber 29 is shown attached to the structure 28 between the points P5 and P6 while the reverse portion forming the loop is not indicated as attached. The purpose for this showing is simply to indicate that it is not essential that all of the lengths of the optical fiber be attached to the structure but rather only that portion or section of the optical fiber along the structure to be monitored defined between appropriate end points. However, it should be understood that the reversed or looped portion could be secured to the structure at a spaced location so that different structural portions of the structure can be monitored by the same optical fiber. In this respect, it should be understood that the particular structural path to be monitored need not be straight but can follow any particular path such as bracing members in towers or platforms which can zig-zag back and forth or other non-linear structures.

It will also be noted that there is a portion of the optical fiber 29 free of the structure 28 between the laser 24 and the structure. This portion 29 of the optical fiber is shown in FIG. 3 to indicate that the light source for providing a light signal can be located remotely from the structure itself, the light signal being transmitted through the optical fiber to pass into the optical fiber portion between the first and second points. Similarly the detecting apparatus can be located remotely from the structure itself The significance of the measurements in all of the embodiments described thus far is that of change. In other words, the optical fiber signature as determined by back scattering, reflection and the like such as in the embodiment of FIG. 1, or, the light signal transmission characteristics such as in the embodiments of FIGS. 2 and 3, are determined when the structure is in a quiescent or safe condition. It is the change in such light signature or light transmission characteristic that constitutes the significant measurement. As mentioned, the optical fiber itself can take any path as long as the movement permitted along that path is representative of movement of the structure to be monitored.

Figure 4:
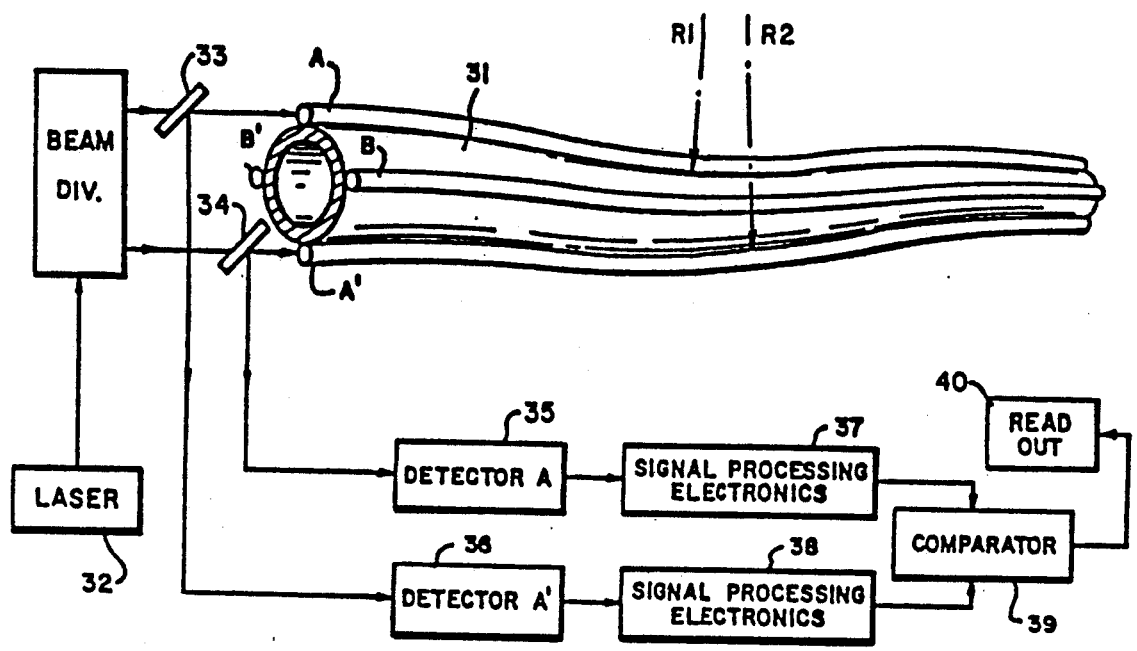
FIG. 4 is a schematic showing partly in block form the manner in which additional optical fibers can be used in accord with the present monitoring system.

Referring now to FIG. 4, there is shown a further embodiment of the present invention which will enable not only the location and magnitude of a physical movement to be measured but also the direction of such movement.

As a specific example, there is shown in FIG. 4 a portion of a pipeline structure 31 to which four optical fibers indicated by the letters A, B, A' and B' are attached. The optical fibers in the example chosen are spaced along four quadrants on the exterior of the pipe structure 31, the pair of optical fibers, A, A' extending along the diametrically opposite top and bottom surfaces and the pair of optical fibers B and B' extending along opposite diametrical sides.

With the foregoing arrangement, and considering by way of example, the first mentioned optical fibers A and A', light is introduced into the fibers by way of a laser 32 and beam divider providing identical light beams passing into couplers 33 and 34. Back-scattering reflection characteristics are coupled out and passed into first and second detectors 35 and 36 for the respective optical fibers A and A' from which the signals are then appropriately processed in blocks 37 and 38. The output from the blocks 37 and 38 pass to a comparator 39 wherein an appropriate computation is made to determine the direction of any physical movement of the pipe affecting the two optical fibers in question. An appropriate read-out 40 will indicate such direction.

More particularly, it will be appreciated that should the pipe 31 bend as a result of losing support under a certain section thereof, the optical fiber A will experience a bending movement having a given radius of curvature R1 as indicated in FIG. 4. Similarly, the other optical fiber A' will experience a bending as a result of the bending of the pipe structure 31 but the radius of curvature of this bending will be larger as indicated at R2. Thus, the optical fiber A at the point R1 will experience a compression while the optical fiber A' at the point R2 will experience a stretching. These changes result in changes in the light signal all as described heretofore and the changes in the light signals themselves are different in that one will indicate a compression and the other an extension. Thus, a vector or direction of the deformation as well as the its magnitude and location can be computed.

Similarly, the direction of lateral movements can be determined by the second pair of optical fibers B and B', shown in FIG. 4 by utilizing similar light introducing and detection circuits.

Figure 5:
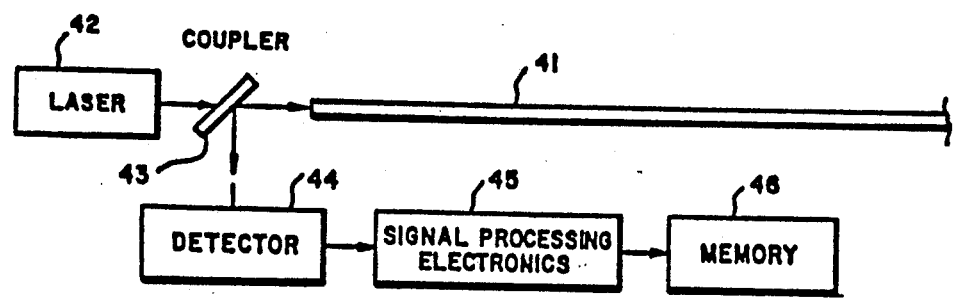
FIG. 5 is a block diagram of a monitoring system in which data is stored in a memory.
Figure 6:
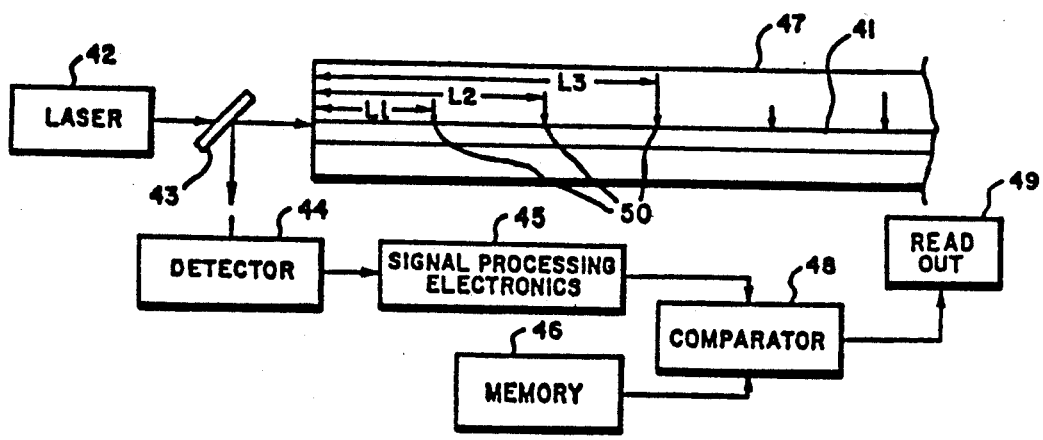
FIG. 6 illustrates the use of data obtained by means of the system of FIG. 5 for monitoring structural integrity in accord with this invention.

Referring now to FIGS. 5 and 6, there is shown a still further technique of structural monitoring using optical time domain reflectometry or optical frequency domain reflectometry (OFDR) in accord with the present invention. Considering first FIG. 5, there is shown an optical fiber 41 into which a light signal from a laser 42 is passed through coupler light signal passing down the optical fiber 41 make up the optical fiber "signature" of the light signal, and this "signature" is detected in the detector 44 while the optical fiber 41 is positioned in a predetermined given path or configuration free of any structure. In FIG. 5 this particular path is illustrated as a rectilinear path or straight line.

The output from detector 44 for the light "signature" is passed into the signal processing electronics block 45 and then stored in a memory bank 46. It will now be understood that memory bank 46 includes the "light signature" for the light in the optical fiber 41 when this optical fiber follows a specific path free of any structure.

Referring now to FIG. 6, all of the identical elements described in FIG. 5 are reproduced except that there is now added a structure 47 to which the optical fiber 41 is secured. It is to be noted, however, that the positioning of the optical fiber on the structure 47 follows the identical path as described for the optical fiber free of the structure in FIG. 5. As also mentioned, this predetermined path in the example chosen for illustrative purposes is a rectilinear line.

The same light source such as the laser 42 described in FIG. 5, and same detector 44 and signal processing electronics blocks 45 are used in FIG. 6 as shown and it will thus be understood that the light "signature" detected by the detector 44 will be identical to the light signature detected in FIG. 5 if and only if the structure 47 exhibits no subsequent physical movements or strains that would cause a movement of the optical fiber 41 away from its predetermined path as illustrated in FIG. 5.

The output of the signal processing electronics 45 in FIG. 6 rather than passing into a memory passes to a comparator 48 for a comparison with the data stored in the memory bank 46 as a consequence of measurements made with the system of FIG. 5. It will now be appreciated that any physical movement of the structure 47 resulting in a shifting of the optical fiber 41 from its predetermined path or straight line in the example chosen will give rise to a signal that is different from that stored in the memory 46. This difference will be detected by the comparator 48 and can be displayed or printed in the read-out 49.

As mentioned, it will be understood that this comparative measurement system will be used for any particular predetermined path for the optical fiber. In the particular example of FIGS. 5 and 6 wherein the path is rectilinear, the system is useful for providing immediate measurements of any positional deviations and their magnitude of the structure from a rectilinear configuration.

FIG. 6 illustrates a further feature of the present invention which can be applied to the other embodiments described. Thus, with reference to the optical fiber 41 secured to the structure 47, it will be noted that there are provided markers 50 which are defined as predetermined types of discontinuities or interruptions in the optical fiber 41 to provide a distinctive type of reflective signal in the light signatures, known as Fresnel reflections, which can be easily detected. These "markers" are indicated as being uniformly spaced along the optical fiber 41 to demark given distances such as L1, L2 and L3. The differences in the marker characteristics are indicated by the different sized arrows 50.

With the foregoing arrangement, there will be provided definite standards in the detected reflected light signal corresponding to known distances; that is, locations along the optical fiber. These standards can thus be used to maintain the location determining accuracy of the monitoring equipment.

It will be understood that the comparison measurements described in FIGS. 5 and 6 are for those situations wherein it is desired to detect a deviation of a structure from a given configuration wherein the information for the desired configuration has previously been stored.

In the actual monitoring systems of the other embodiments, similar principles are involved in that there is always being made a comparison of output data with output data previously received either recently or at remote periods in time. In other words, and as heretofore mentioned, it is the change in the characteristics which are significant in the overall monitoring operation. Various alternative monitoring techniques can be used, including but not limited to polarization and interferometry methods. In such techniques, a schematic system similar to FIG. 3 would be used, with the detector including means for comparing the signal output through the fiber with the original signal.

As will be evident from the foregoing description, when a physical movement is to be detected, the monitoring equipment of FIG. 1 can be employed with pulsed light and the change in the light signal that is detected constitutes an OTDR-type signal. The magnitude of the reflected signal is proportional to the strain introduced by the physical movement. The location or position of the strain change is determined, in turn, by the time it takes for the light signal to make a round trip from its starting point at one end of the fiber to the point of the strain change resulting from the physical movement of the structure and back to the starting point. In the embodiment described, it is the back-scattering of light resulting from light loss at the point of physical movement or strain change that is detected. Such back-scattering is known as Rayleigh reflections as opposed to the aforementioned Fresnel-type reflections which appear in the form of spikes. Since the speed of light in the fiber optic is known, the distance from the one end of the fiber optic cable to the disturbance or location of the physical movement of the structure is easily computed. A similar embodiment can be used for optical frequency domain reflectometry (OFDR), using appropriate chirping techniques.

The sensitivity of the fiber optic to a physical movement or strain-related deflection can be greatly increased by making use of a phenomenon known as "microbending". This phenomenon can be briefly explained as follows: Essentially, an optical fiber functions as a waveguide. It normally includes a core surrounded by a cladding of material having a different index of refraction from that of the core. Light is thus internally reflected at the interface of the core and cladding and generally precluded from escaping from the core. The light is thus essentially propagated or guided down the core.

Imperfections at any point along the cladding will result in a change in its refractive index. This change, in turn, permits some light to escape, representing loss; reflection changes also occur at such discontinuity and these reflections, as mentioned, are termed Rayleigh back-scattering.

By subjecting the cladding to aggravation, the aforementioned change in refractive index can be induced from a point on the surface of the cladding. This disturbance will create the same effect as imperfections and result in light loss by accentuating microbending and Rayleigh reflections.

U.S. Pat. No. 4,421,979 to Asawa et al discloses the use of microbend transducers which include mechanical amplifiers to facilitate detections of remote structural forces. These transducers are located at discrete points on a structure. An optical fiber free of the structure is engaged periodically by the transducers so that reflections are only detectable from discrete locations.

In accord with an important feature of the present invention, I have provided not only a continuous structural monitoring system but also greatly increased its sensitivity by providing an improved optic fiber construction which, in effect, provides a superior sensor cable. This cable incorporates an integral continuum of microbend elements, thereby amplifying the reflected signal from a physical movement of the structure at any point along the structure to which the fiber is attached.

All of the foregoing will be better understood by now referring to FIGS. 7 through 10.

Figures 7, 8:
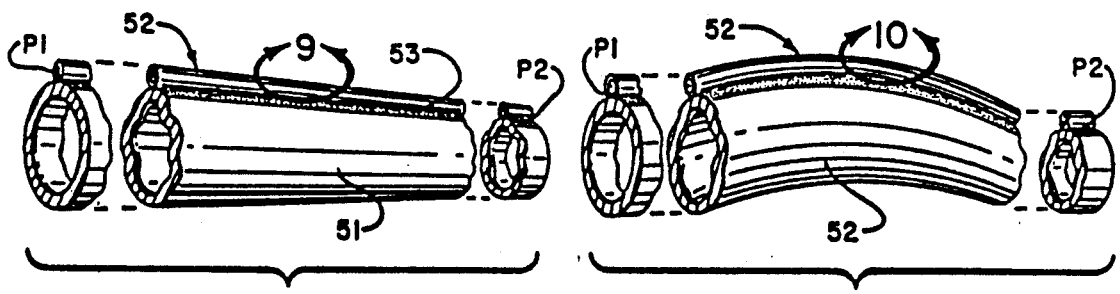
FIG. 7 is a fragmentary perspective view of a fiber optic cable continuously attached to a pipeline similar to the showing of FIG. 1 but wherein greatly increased sensitivity is realized by the manner in which the fiber optic cable is constructed.
FIG. 8 is a view of the pipeline and cable of FIG. 7 wherein a physical movement such as bending of the pipeline has taken place.

In FIG. 7 there is shown a pipeline 51 with fiber optic cable 52 continuously attached thereto as by cement 53 between spaced points P1 and P2. The showing is similar to FIG. 1.

FIG. 8 shows the cable 52 subject to a physical movement such as a bend as a result of movement of a portion of the pipeline 51.

It will be understood that a light signal is passed through the cable 52 and changes detected by appropriate equipment such as shown in FIGS. 5 and 6.

Figure 9:
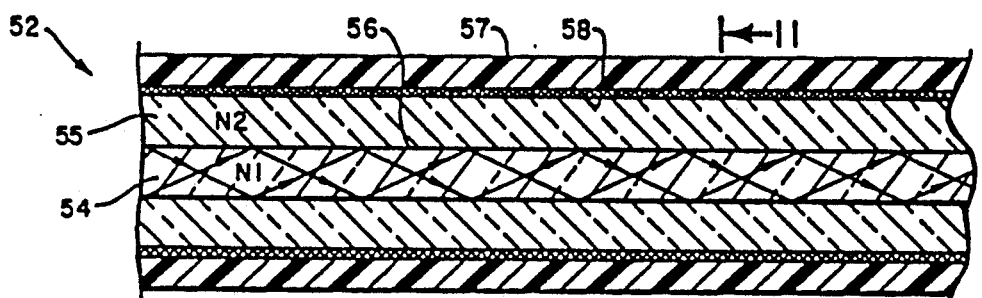
FIG. 9 is a greatly enlarged cross-section of that portion of the cable in FIG. 7 enclosed within the circular arrow 9.

FIG. 9 shows the improved sensor cable 52 in greater detail wherein the fiber optic essentially constitutes a core 54 surrounded by cladding 55. Core 54 has a refractive index of N1 while cladding 55 has a different refractive index N2. A first light signal represented by the lines with arrows in the core of FIG. 9 is substantially retained in the core by internal reflections from the interface 56 of the core and cladding so long as the index of refraction N2 of the cladding is not changed.

In accord with a feature of the present invention, a sheath 57 of woven fabric or the like such as Kevlar surrounds the cladding and has a coating 58 of fixed particulate material uniformly spread over its interior wall surface in intimate engagement with the outer surface of the cladding 55. This particulate material may have a representative grain size of from 5 to 23 microns. The coating 58 is similar to a sand paper and as mentioned engages the cladding continuously through out the length of the cable.

Whenever a disturbance occurs, such as a bending of the pipeline portion as depicted in FIG. 8, a strain in the sheath 57 will induce the particulate material to distort the homogeneity of at least a portion of the cladding 55. In other words, a physical movement between the spaced points of the structure sets up a strain change in the sheath, cladding and core at a point corresponding to the location of the physical movement. In this respect, it will be understood that the spaced points P1 and P2 of FIGS. 1 and 7 could typically be several meters or even kilometers apart. The portion of the pipeline experiencing a bending or physical movement, on the other hand might be over only a short distance at any location between the points. It is over this relatively short distance that the distortion of the cladding will cause an enhanced back-scattering type reflection due to loss of light. Thus, because of the continuous attachment of the cable, any point between the spaced points that is disturbed will experience microbend reflections in the optical fiber at the same point and thereby more accurately determine the location of such point and the magnitude of the disturbance.

Figure 10:
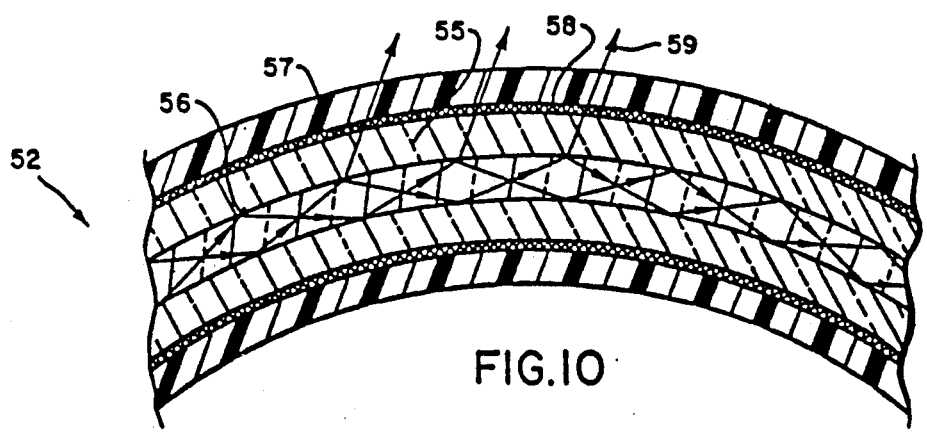
FIG. 10 is a greatly enlarged cross-section of that portion of the cable of FIG. 8 enclosed within the circular arrow 10.

FIG. 10 shows the cable section of FIG. 9 under the bending condition shown in FIG. 8. It will be noted that the light rays within the core may still experience some internal reflection at the interface 56 while other light rays escape such as indicated at 59. As mentioned, the loss of light is a result of the distortion of the cladding by the particulate coating 58 caused by the bending of the cable.

In FIGS. 9 and 10 the sheath 57 can be the same as the protective sheath 12 referred to in FIG. 1. In this respect, the sheath protects the cable from contaminants such as radiation, gases, moisture, etc., and also serves as an attachment means to the structure and thus is designed to transmit any physical movement to the optical fiber concurrently with "protecting" the fiber from the surrounding environment.

Figures 11, 12:
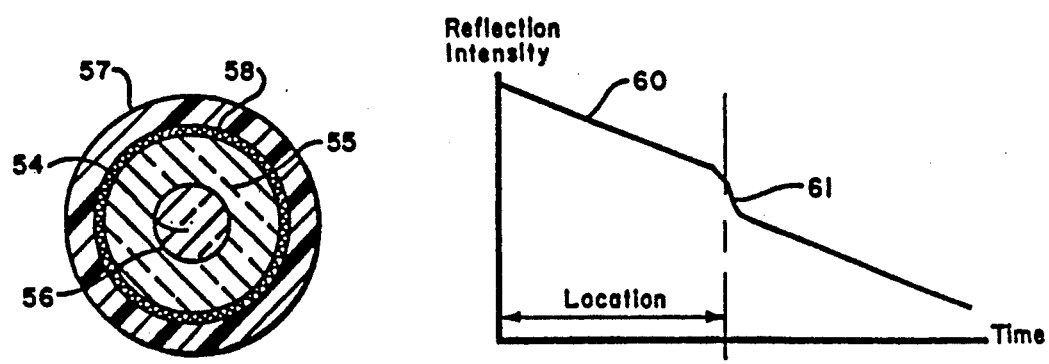
FIG. 11 is a cross-section taken in the direction of the arrows 11—11 of FIG. 9.
FIG. 12 is a plot of reflection intensity as a function of time and thus distance, useful in explaining the monitoring techniques.

FIG. 11 shows the sensor cable in cross-section wherein it is clear that the particulate coating 58 completely surrounds the cladding 55.

FIG. 12 illustrates a logarithmic plot of the measured reflected signal intensity (ordinate) as a function of time (abscissa). Since the light signal travels unit distances in unit time intervals, the time is also a function of distance. The plot shown depicts a situation where a disturbance has taken place in the structure causing bending of the optical fiber at a point between the spaced points P1 and P2 of the pipeline.

Utilizing a pulsed light signal, back-scattering or Rayleigh reflections will occur at the point of loss of light. The normal attenuation of the reflected signal in an optical fiber with increasing distance is shown at 60. At 61 there is shown a sudden loss of light resulting from a structure caused strain on the fiber as described. The distance of this loss 61 from the zero point on the plot defined the location of the structural movement and the amount of loss at 61, the magnitude.

It will be recalled with respect to FIG. 4 that the direction of any structural movement can be determined by providing further sensor cables affixed to the structure. In addition, the rate of movement or "dynamics" of the movement can be determined by using the time response of the structure in a given direction and noting when that movement returns to its original position.

Further alternative forms of the invention are illustrated in FIGS. 13–18, primarily for purposes of depicting a variety of specific applications of the invention to particular uses in monitoring structural response to applied forces caused by stress, strain, pressure, temperature, etc. In each case, the invention provides a distributed sensor in the form of a modified optical fiber having a portion in intimate, continuously force-coupled relation with the structure in a surrounding and/or impacting environment. This optical fiber can be adapted as desired to insure sensing of the desired parameter, for example, strain, pressure or temperature.

Figure 13:
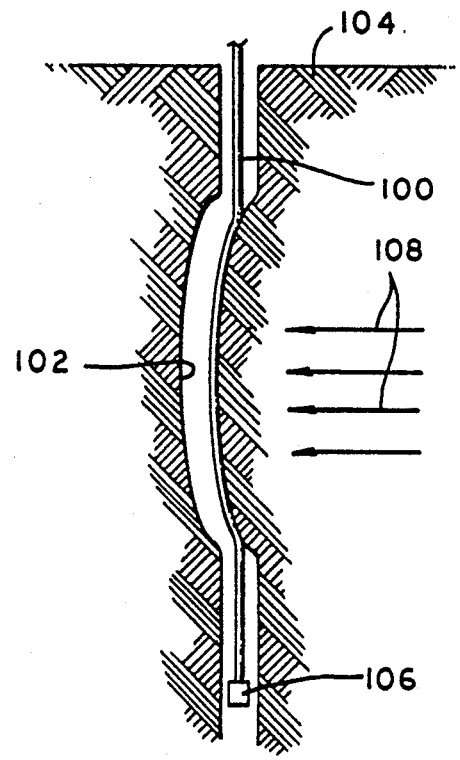
FIG. 13 is a somewhat schematic diagram illustrating use of the invention in monitoring earth movements.

More particularly, with reference to FIG. 13, an optical fiber sensor cable 100 which can be constructed according to the description of FIGS. 9–12 is suspended vertically into a bore hole 102 formed into the earth 104. This sensor cable 100 is normally preloaded within the bore hole 102 by a weight 106 at the lower end of the fiber. When mounted in this manner, OTDR or other monitoring techniques as described previously herein can be used to detect bending or pressure-induced microbending of the sensor cable 100 at any point or points along its length, wherein such bending could be caused by lateral spreading or shifting of the earth 104, as depicted in FIG. 13 by arrows 108. Such lateral motion of the earth could also be due to tilting or other shifting which might occur, for example, at fault lines. In any case, the positional shifting of the sensor cable 100 can be monitored in terms of magnitude and location using the previously described OTDR techniques.

Figure 14:
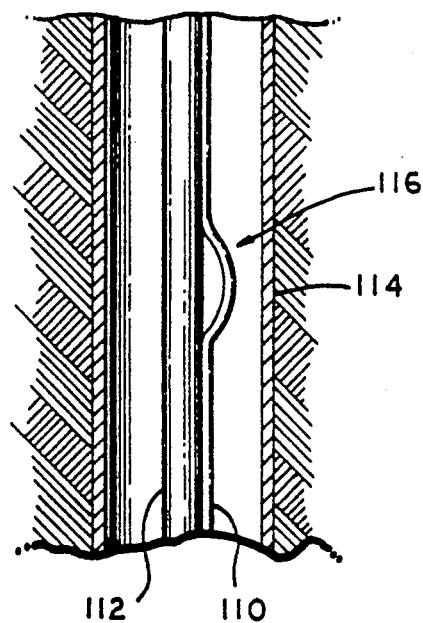
FIG. 14 is a somewhat schematic diagram illustrating use of the invention in monitoring pressure forces acting against structures within an oil or gas well.

FIG. 14 illustrates mounting of a sensor cable 110 continuously along production tooling 112 or other structures mounted within the casing 114 of an oil or gas well or the like. In this arrangement, the sensor cable 110 provides a distributed sensor extending continuously along the production tooling or the like for remote structural integrity monitoring of the tooling. In addition, or in lieu of mounting to the tooling 112, the sensor cable 110 or selected portions thereof can be suspended freely within the casing 114, illustrated by arrow 116 in FIG. 14. In this case, the cable is subjected to fluid pressures within the well casing 114, with the fluid within the well casing providing the "structure" to which the fiber is attached continuously as a distributed sensor. Detection of tooling movements and/or pressure effects is achieved, for example, by OTDR monitoring, as previously described. Such pressure effects may be monitored with improved sensitivity by providing the sensor cable with a jacket of the type described with respect to FIGS. 9–11, wherein said jacket responds to pressure changes and transmits a resultant force to the encased fiber to induce microbending.

Figure 15:
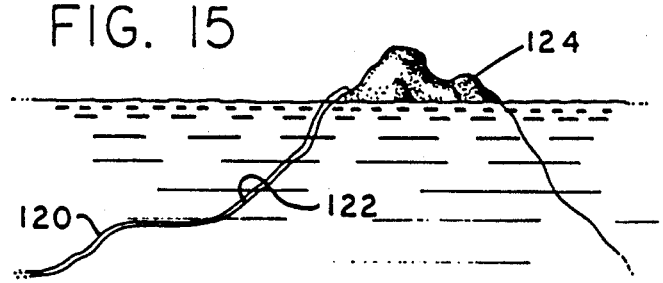
FIG. 15 is a somewhat schematic diagram illustrating use of the invention for monitoring pressure changes within a fluid, for example, in the ocean floor.
Figure 18:
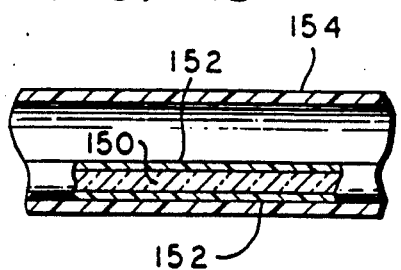
FIG. 18 is a somewhat schematic diagram illustrating use of the invention for monitoring the temperature of surrounding space.

FIG. 15 depicts still another alternative environment of use of the invention. More specifically, FIG. 15 illustrates an optical fiber sensor cable 120 extending along an ocean floor 122 to monitor fluid (water) pressure at various depths to obtain, for example, a profile of the ocean pressure. In this illustration, one end of the sensor cable 120 extends to an above-water location at an island 124 to permit remote monitoring of pressure along the entire distributed length of the sensor cable 120 using, for example, the previously discussed OTDR techniques. Once again, the sensor cable 120 is force-coupled over a continuous length thereof with a structure in the form of the monitored fluid to provide a distributed pressure read-out The read-out may be enhanced by use of a pressure transmitting and microbend-inducing jacket or the like on the fiber, as described in FIGS. 9–11, in which case the jacket combines with the monitored fluid to provide the force-coupled structure.

Figure 16:
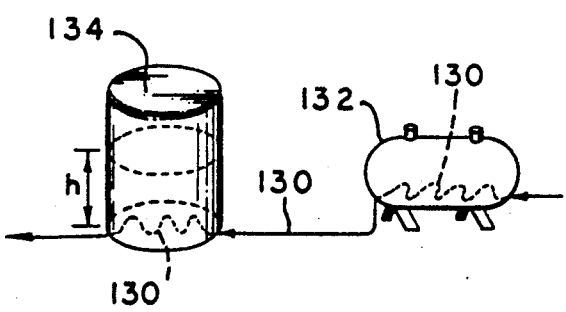
FIG. 16 is a somewhat schematic diagram illustrating use of the invention for monitoring fluid pressures within fluid-containing vessels.

In FIG. 16, still further pressure monitoring applications are illustrated with an optical sensor cable 130 passed through a vessel 132 for containing a fluid such as a gas under pressure, In this environment, the cable 130 can be monitored along the length within the pressure vessel 132 to provide a read-out reflecting fluid pressure therein. Alternately, or in addition, the cable 130 can extend along the bottom of a liquid storage vessel 134 to provide a pressure reading reflective of the liquid level or quantity within the storage vessel. In either case, OTDR techniques are usable to perform remote pressure monitoring. Once again, a protective coating and jacket on the cable may be used, as described previously, for enhanced sensitivity.

Figure 17:
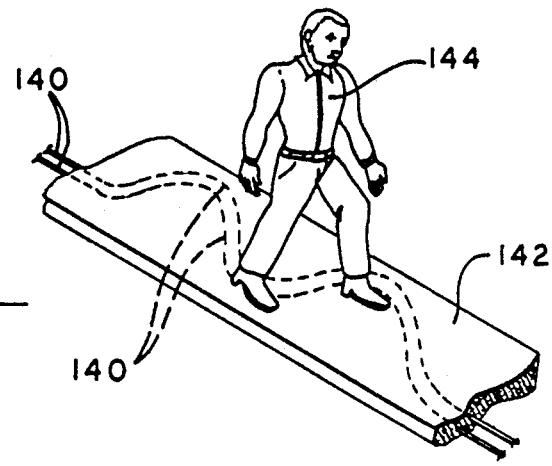
FIG. 17 is a somewhat schematic diagram illustrating use of the invention for monitoring pressure forces acting against a structure having one or more fibers embedded therein.

FIG. 17 illustrates an alternative application of structural monitoring to determine the location and magnitude of forces applied to a structure. In this example, one or more sensor cables 140 are embedded within or otherwise suitably continuously attached to a walkway 142. These cables 140 can be monitored as described previously herein to detect forces applied to the walkway 142 due, for example, to the presence of an unauthorized intruder 144. The continuous force-coupled mounting of the cables within the structure advantageously permits force magnitude and location to be identified. Of course, other types of forces may be monitored by embedding one or more cables into other types of structures, for examples, aircraft wing and frame components, bearings and seals, etc.

In the foregoing strain and pressure monitoring applications, the optical fiber cable (including core, cladding, coating, jacket, sheath, etc.) can be designed to be temperature insensitive to or controlled (in attenuation change) by the known thermal response of the structure to which it is attached.

The invention may also be adapted for use in monitoring other physical parameters such as temperatures. For example, an optical fiber sensor cable generally of the type previously described may be mounted in continuously attached relation with structures subjected to temperature variations to monitor structural size and/or shape changes in response to temperature changes. Such applications would include, for example, coupling the cable with critical components in high performance aircraft or spacecraft, or coupling the fiber to various processing equipment subjected to temperature variations, particularly in environments not subjected to appreciable simultaneous pressure variations. As viewed in FIG. 18, an optical fiber cable 150 is encased within a protective jacket 152 designed to respond to temperature variations and to transmit appropriate forces to the fiber cable. The protective jacket then becomes the structure and the cable, as a sensor, is subject to the thermal profile experienced by the structure, similar to that for pressure as outlined by FIGS. 13-15. In some instances, when pressure is also a factor, the fiber cable 150, of FIG. 18, and jacket 152 may be encased within a protective outer liner or casing 154 of rigid tubing or the like to isolate the fiber cable from the effects of surrounding pressure, for example, fluid pressure at varying depths within the ocean or within an oil or gas well. Again, OTDR or OFDR or similar monitoring techniques are utilized to obtain a distributed sensor read-out reflective of the sensed temperature changes in the structural environment along the length of the cable. Also, as for pressure, a cable coating and jacket may be used, as described previously, for enhanced sensitivity.

Figure 19:
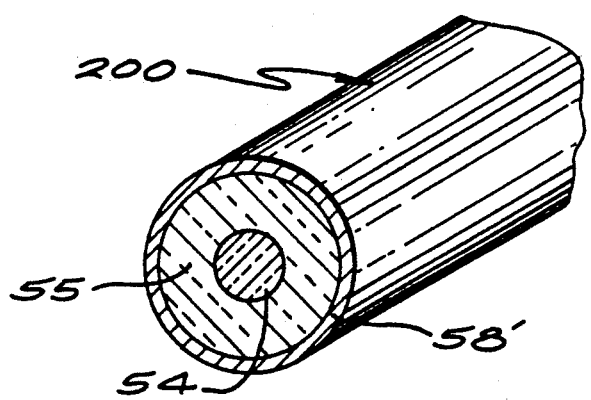
FIG. 19 is a fragmented perspective view illustrating an alternative fiber optic cable constructed generally in accordance with FIGS. 9–11, wherein a fixed particulate material is integrated into a protective outer buffer coating.

FIGS. 19-22 illustrate a preferred optical fiber sensor cable construction which can be adapted for use in the various monitoring applications described above. More particularly, the basic preferred cable configuration is shown in FIG. 19 with a geometry conforming generally to that shown in FIGS. 9-11. The optical cable 200 comprises a core 54 surrounded by a cladding 55 having the appropriate refractive indeces. The core 54 and cladding 55 are encased in turn within a buffer coating 58' which includes the dispersed particulate material as previously described with respect to FIGS. 9-11. FIG. 19 illustrates the particulate material integrated into or mixed within a carrier, wherein the composite buffer coating 58' protects the fiber cladding 55 in addition to causing changes in transmitted or reflected light signals in response to radially applied forces. A preferred carrier material comprises a polymer such as polyimide selected for high temperature environments without significant degradation.

Figure 20:
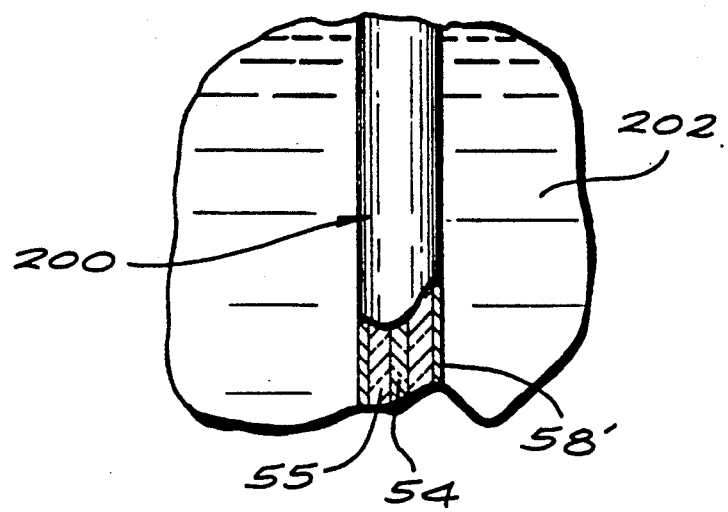
FIG. 20 is a somewhat schematic diagram illustrating the fiber optic cable of FIG. 19 in a pressure monitoring application.

The optical fiber cable 200 of FIG. 19 can be used in a variety of applications for monitoring purposes. As one example, as depicted in FIG. 20, the fiber cable 200 can be used without further protective jacketing in a fluid or other pressure inducing media 202 or the like as a pressure monitor. Radial forces applied locally to the fiber cable 200 act through the buffer coating 58' to urge the particulate material intimately against the cladding, resulting in light signal changes as previously described. The effective continuous coupling between the buffer coating 58' and the monitored media permits close pressure monitoring in adverse or otherwise difficult to access environments, such as within oil wells, etc. Moreover, the monitored media 202 may take other forms, such as a solid having the fiber cable 200 embedded therein. By use of the buffer coating 58' which integrally includes the particulate, the entire cable can be constructed with an extremely small diameter compatible, for example, for embedment into aerospace or other structures which may be formed from composite materials. The size and quantity of particulate used in the buffer coating can be tailored to select specific system resolution, with a submicron particulate size providing the desired resolution in some systems. Moreover, the particulate can be used in variable grain size or in variable density gradient along the cable length to provide a selected system sensitivity which can be designed to avoid frequency dependent alterations.

Figure 21:
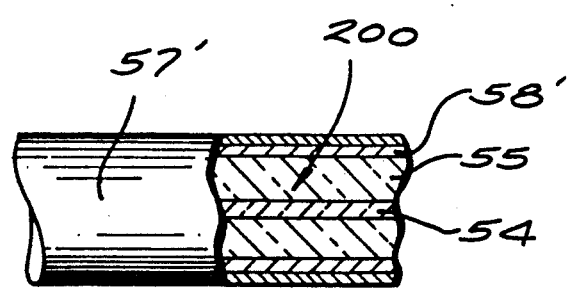
FIG. 21 is a fragmented side elevational view of a fiber optic cable constructed according to FIG. 19, and further including a temperature responsive outer jacket.

FIG. 21 depicts the optical fiber cable 200 inclusive of the buffer coating 58' encased within an outer jacket 57' of a temperative responsive material. In particular, the outer jacket 57' is formed from virtually any jacketing or sheath material such as a selected elastomeric compound chosen to expand and contract in response to temperative variation. With this construction, the jacket 57' applies variable radial forces to the buffer coating 58' as a temperative function. These variable radial forces correspondingly alter the specific engagement between the particulate and the cladding to permit remote temperature monitoring of a fluid or solid structure.

Figure 22:
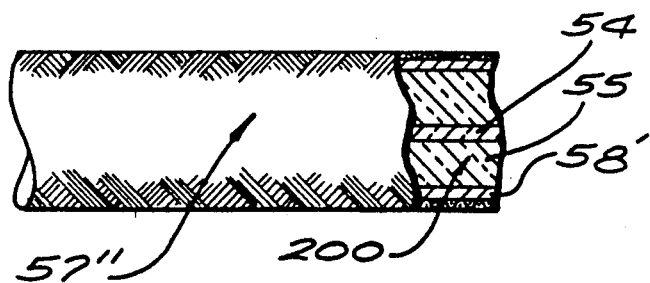
FIG. 22 is a fragmented side elevational view of fiber optic cable constructed according to FIG. 19, and further including a strain responsive outer jacket.

FIG. 22 shows the optical fiber cable 200 jacketed by an alternative outer jacket 57" formed from a woven fabric of Kevlar or the like. The jacket 57" is woven in a Chinese braid or the like to apply variable radial compression to the fiber cable 200 in response to movements of the fabric jacket. In a typical preferred application, the jacket 57" can be continuously coupled with an appropriate structure to monitor structural movements induced by strain or the like. Such movements result in longitudinal extensions or retraction of the jacket 57" and corresponding alteration of compressive forces applied to the fiber. Once again, particulate size and quantity and/or distribution can be varied as needed to provide a desired system resolution.

From all of the foregoing, it will now be evident that the present invention has provided an improved method and apparatus for enabling continuous monitoring of a structure for integrity as well as for thermal or pressure related conditions or effects and to cover all points between starting and end points on the structure, including those comprised of fluid or gas mediums. In other words, the output of this system output will be continuous relative to the structure, not at discrete locations only as with strain gauges previously mentioned or other prior art systems employing microphones, tilt meters using accelerometers, discrete microbend transducers, and the like.

Various further applications and modifications falling within the scope and spirit of this invention will occur to those skilled in the art. The method and apparatus accordingly are not to be thought of as limited to the specific embodiment set forth merely for illustrative purposes.

What is claimed is:

1. An apparatus for monitoring a physical movement between spaced points on a structure including, in combination:

at least one optical fiber;

means for coupling said optical fiber continuously to said structure to extend from at least one of the spaced points to the other and thereby engage all points between said spaced points so that physical movement of the structure at a location between said spaced points will result in physical movement of the optical fiber at a location corresponding with the location of movement of the structure;

means for passing a first light signal into said optical fiber; and means for detecting and indicating changes in said first light signal to thereby detect that a physical movement has taken place;

said at least one optical fiber comprising an optical fiber sensor cable including a core, a cladding surrounding said core and having an index of refraction different from the index of refraction of said core, and a coating surrounding said cladding, said coating including a particulate material in intimate engagement with said cladding, said particulate material being movable radially toward and away from said cladding to distort the homogeneity of at least a portion of said cladding to change the index of refraction thereof.

2. The apparatus of claim 1 wherein said particulate material engages the cladding continuously throughout the length of said cable.

3. The apparatus of claim 1 further including means for moving said particulate material toward and away from said cladding.

* * * * *